(12) United States Patent  
Gillam et al.

(10) Patent No.: US 9,411,877 B2
(45) Date of Patent: Aug. 9, 2016

(54) ENTITY-DRIVEN LOGIC FOR IMPROVED NAME-SEARCHING IN MIXED-ENTITY LISTS

(75) Inventors: Richard Theodore Gillam, Chantilly, VA (US); Frankie Elizabeth Patman Maguire, Washington, DC (US); Leonard Arthur Shaefer, Jr., Leesburg, VA (US); Frank Everett Whaley, Roanoke, VA (US); Charles Kinston Williams, Fairfax, VA (US)

(73) Assignee: International Business Machines Corporation, Armonk, NY (US)

( * ) Notice: Subject to any disclaimer, the term of this patent is extended or adjusted under 35 U.S.C. 154(b) by 1452 days.

(21) Appl. No.: 12/203,451

(22) Filed: Sep. 3, 2008

(65) Prior Publication Data

US 2010/0057713 A1 Mar. 4, 2010

(51) Int. Cl.
*G06F 17/30* (2006.01)
*G06F 17/27* (2006.01)

(52) U.S. Cl.
CPC ........ *G06F 17/30604* (2013.01); *G06F 17/278* (2013.01); *G06F 17/30607* (2013.01)

(58) Field of Classification Search
CPC ............ G06F 17/278; G06F 17/30604; G06F 17/30607
USPC .................................................. 707/999.104
See application file for complete search history.

(56) References Cited

U.S. PATENT DOCUMENTS

| | | | |
|---|---|---|---|
| 2,605,918 A | 8/1952 | Roscoe | |
| 5,819,263 A | 10/1998 | Bromley et al. | |
| 6,248,039 B1 | 6/2001 | Hibi | |
| 6,408,306 B1 | 6/2002 | Byrne et al. | |
| 6,591,300 B1 | 7/2003 | Yurkovic | |
| 6,778,979 B2 | 8/2004 | Grefenstette et al. | |
| 6,820,076 B2 | 11/2004 | Bailey et al. | |
| 6,871,287 B1 | 3/2005 | Ellingson | |
| 7,162,470 B2 | 1/2007 | Sharma et al. | |
| 7,177,862 B2 | 2/2007 | Zhang et al. | |
| 7,233,937 B2 | 6/2007 | Subramaniam | |
| 7,461,090 B2 | 12/2008 | Blinn et al. | |
| 7,502,787 B2 | 3/2009 | Bailey et al. | |
| 7,577,641 B2 | 8/2009 | Koch et al. | |
| 2001/0049674 A1 | 12/2001 | Talib et al. | |
| 2002/0087558 A1 | 7/2002 | Bailey et al. | |
| 2002/0091690 A1 | 7/2002 | Bailey et al. | |
| 2003/0115060 A1 | 6/2003 | Junqua et al. | |
| 2004/0054691 A1* | 3/2004 | Sharma et al. ............. 707/104.1 |

(Continued)

OTHER PUBLICATIONS

U.S. Appl. No. 11/863,209, Patman Maguire et al.

(Continued)

*Primary Examiner* — Ann J Lo
(74) *Attorney, Agent, or Firm* — David W. Victor; Konrad, Raynes, Davda & Victor LLP

(57) ABSTRACT

According to one embodiment of the present invention, a method for name searching in mixed-entity lists is provided which comprises dividing a mixed list of entities into a plurality of entity-specific lists. A name to be searched is then categorized into a category and a specialized search logic is applied to the name to be searched. The specialized search logic is selected to be adapted to the category and uses a one of the entity-specific lists that corresponds to the category of the name to be searched. A shared search logic may also be employed, which is used for all names to be searched.

6 Claims, 3 Drawing Sheets

(56) References Cited

U.S. PATENT DOCUMENTS

| | | |
|---|---|---|
| 2004/0162916 A1 | 8/2004 | Ryan |
| 2004/0230461 A1 | 11/2004 | Talib et al. |
| 2004/0243588 A1 | 12/2004 | Tanner et al. |
| 2005/0065982 A1 | 3/2005 | Bailey et al. |
| 2005/0119875 A1 | 6/2005 | Shaefer et al. |
| 2005/0198056 A1 | 9/2005 | Dumais et al. |
| 2005/0246374 A1 | 11/2005 | Blinn et al. |
| 2006/0031239 A1 | 2/2006 | Koenig |
| 2006/0059185 A1 | 3/2006 | Bocking et al. |
| 2006/0100788 A1 | 5/2006 | Carrino et al. |
| 2006/0248039 A1 | 11/2006 | Brooks et al. |
| 2007/0005567 A1 | 1/2007 | Hermansen et al. |
| 2007/0005578 A1 | 1/2007 | Patman et al. |
| 2007/0005586 A1 | 1/2007 | Schaefer et al. |
| 2007/0011168 A1 | 1/2007 | Koehane et al. |
| 2007/0067280 A1 | 3/2007 | Zhou et al. |
| 2007/0220268 A1 | 9/2007 | Krishnaprasad et al. |
| 2008/0059607 A1 | 3/2008 | Schneider |
| 2008/0091412 A1 | 4/2008 | Strope et al. |

OTHER PUBLICATIONS

Patrick Reuther, "Personal Name Matching: New Test Collections and a Social Network-Based Approach", Dept. of Database and Info. Systems, Mar. 16, 2006, 23 pages, Trier, Germany.

Amendment 1, Feb. 19, 2010, for U.S. Appl. No. 11/863,209, Total 27 pp.

Amendment 3, Dec. 22, 2010, for U.S. Appl. No. 11/863,209, Total 19 pp.

Final Office Action 1, May 18, 2010, for U.S. Appl. No. 11/863,209, Total 26 pp.

Notice of Allowance 1, Jan. 25, 2011, for U.S. Appl. No. 11/863,209, Total 20 pp.

Office Action 1, Oct. 19, 2009, for U.S. Appl. No. 11/863,209, Total 32 pp.

Office Action 3, Sep. 22, 2010, for U.S. Appl. No. 11/863,209, Total 12 pp.

RCE1 & Amendment 2, Aug. 5, 2010, for U.S. Appl. No. 11/863,209, Total 19 pp.

Wikipedia, "Wikipedia: Lists", [online], [Retrieved on Jul. 23, 2008]. Retrieved from the Internet at <URL: http://en.wikipedia.org/wiki/Wikipedia:Lists>, Total 8 pp.

Christen, P., "A Comparison of Personal Name Matching: Techniques and Practical Issues", Sixth IEEE International Conference on Data Mining—Workshops, Dec. 18-22, 2006, IEEE Computer Society, Total 5 pp.

Notice of Allowance 2, May 19, 2011, for U.S. Appl. No. 11/863,209, filed Sep. 27, 2007 by F.E. Patman Maguire et al., Total 14 pp.

* cited by examiner

ENTITY-DRIVEN LOGIC FOR IMPROVED NAME-SEARCHING IN MIXED-ENTITY LISTS

BACKGROUND

The present invention relates to techniques for searching a database, and more specifically, to name-searching in mixed-entity lists.

There are various techniques for searching for names in structured lists. Many structured lists contain two or more types of named entities, such as personal names, organization names, product names, place-names, and others. Searching such lists may require that the searching and matching logic be expressed in terms of properties common to all the named-entity types comprised within the list. For example, the common properties may include the characters and/or symbols in which they are represented, length, number of tokens and other such basic properties.

Existing search results typically focus on basic string-similarity and token-alignment techniques, which do not approach the intuitive outcomes produced by humans. In some cases these similarity-measurement techniques may be supplemented by use of standard stop-word and noise-word lists, to focus matching and scoring logic on the more meaningful constituent elements in each candidate match-name.

SUMMARY

Method, system, and computer program product for database searching is provided. In one implementation, the method comprises: dividing a mixed list of entities into a plurality of entity-specific lists; categorizing a name to be searched into a category; and applying a specialized search logic to the name to be searched using a selected one of the entity-specific lists, the specialized search logic corresponding to the category.

DETAILED DESCRIPTION

Embodiments of the invention provide techniques for name searching, which automatically separate a list of mixed named-entities into logical sublists, each list therefore comprising only one type of named entity. When this preliminary step is taken, all matching and scoring logic applied subsequently to each list can be differentiated according to the nature and linguistic properties of the named-entities in that list. In a trivial example, the term VAN might be considered a noise-word when searching in a list of personal names, since it occurs commonly as a prefix in many European and North American names. However, the same term would be meaningful in a list of organization names, where it would indicate a particular type of transportation business.

Thus, in accordance with an embodiment of the invention, in the above example, the mixed named entities may be first separated into separate sublists, one sublist containing personal names and another containing organization names. The nature of the name to be searched is then determined. If the name to be searched is an organization name, then specialized search logic is used, which searches the organization name sublist looking for the word "VAN". If instead, the name to be searched was determined to be a personal name, then the specialized search logic that is used will ignore the noise word "VAN", and this specialized search logic will be applied to the sublist containing personal names.

In general, entity-differentiation as a search architecture allows a great deal of additional semantic, pragmatic and syntactic evaluation of each candidate name, without the drawback of "fratricidal" outcomes wherein a search technique that improves search results for one type of named entity also degrades search results obtained for a different type of named entity. The effectiveness of the search is improved because the searching and matching logic does not need to be expressed in terms of properties to all the named-entities on the original mixed list, as required by the prior art.

The advantages of the approach of the present invention may be instanced in a specialized set of matching and scoring techniques that are uniquely applicable to business and other organizational names. In addition to measures based on standard orthographic-similarity concepts, the invention may automatically identify specific business categories associable with a name, which enables subsequent measurement of semantic distance between two intuitively related but orthographically dissimilar names, such as JOE'S PIZZA PARLOR and JOE'S ITALIAN RESTAURANT. As new types of named entities are introduced into a mixed list, embodiments of the invention support the addition of a set of entity-specific matching and scoring techniques for each, without deleterious impact on scoring logic associated with established types.

Figure 1:
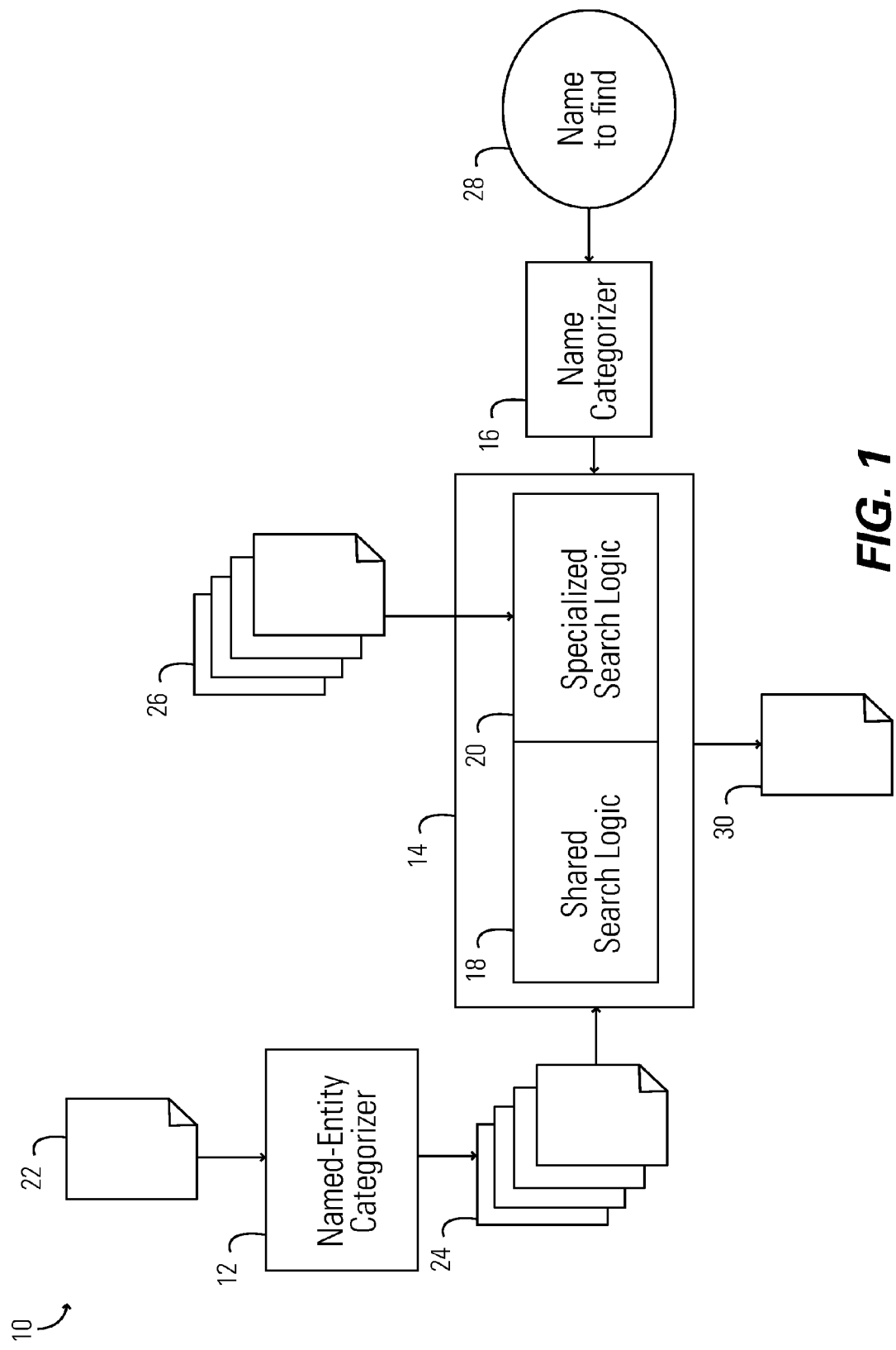
FIG. 1 shows a diagram of a search system in accordance with an embodiment of the invention.

Referring now to FIG. 1, there is shown a system 10 for performing name searching in accordance with an embodiment of the invention. The system 10 includes a named entity categorizer 12, a search logic unit 14, and a name to be searched categorizer 16. The search logic unit 14 includes a shared search logic unit 18 and a specialized search logic unit 20.

In this embodiment of the invention, a two-phase process is employed. In the first, or preparatory, phase the named entity categorizer 12 receives a mixed-entity structured list 22, which potentially comprises more than one category of named entity. The named entity categorizer 12 examines each name in the list 22 and automatically differentiates the mixed-entity list into a group of subsets, or sublists 24, each of which comprises entries representing only one type of named entity. For example, there may be separate sublists 24 for personal names, business or other organizational names, product names and place names.

In the second, or search, phase the various sublists 24 are provided as input to the search logic unit 14. Within the search logic unit 14, the shared search logic unit 18 is applied to all types of named entities. The specialized search logic unit 20 is designed to be applied to only a single type of named entity. Various sets of entity-specific reference-data files 26 are also provided as input to the specialized search logic unit 20 for consideration and evaluation when a named-entity of a particular type of category is being evaluated. The last input to the search system 10 is the name to be found 28, which may or may not be identified a priori as being of a particular named-entity type.

In cases where the name to be found 28 is not identified, the name to be found categorizer 16 is used to categorize the name to be found. Both the shared search logic unit 18 and the specialized search logic unit 20 are then applied to each candidate name in the particular sublist 24 which corresponds to the category of the name to be found. As mentioned above, the specialized search logic unit 20 uses the entity-specific reference data files 26 when evaluating the name to be searched. In some embodiments, the shared search logic unit 18 and the specialized search logic unit 20 may use conventional techniques to identify, score and rank a set of candidate match-names. In other embodiments, specialized matching and scoring techniques that are uniquely applicable to particular categories may be used, as discussed above. The resulting candidate match-names may then be reported out from the search mechanism as search results 30.

Figure 2:
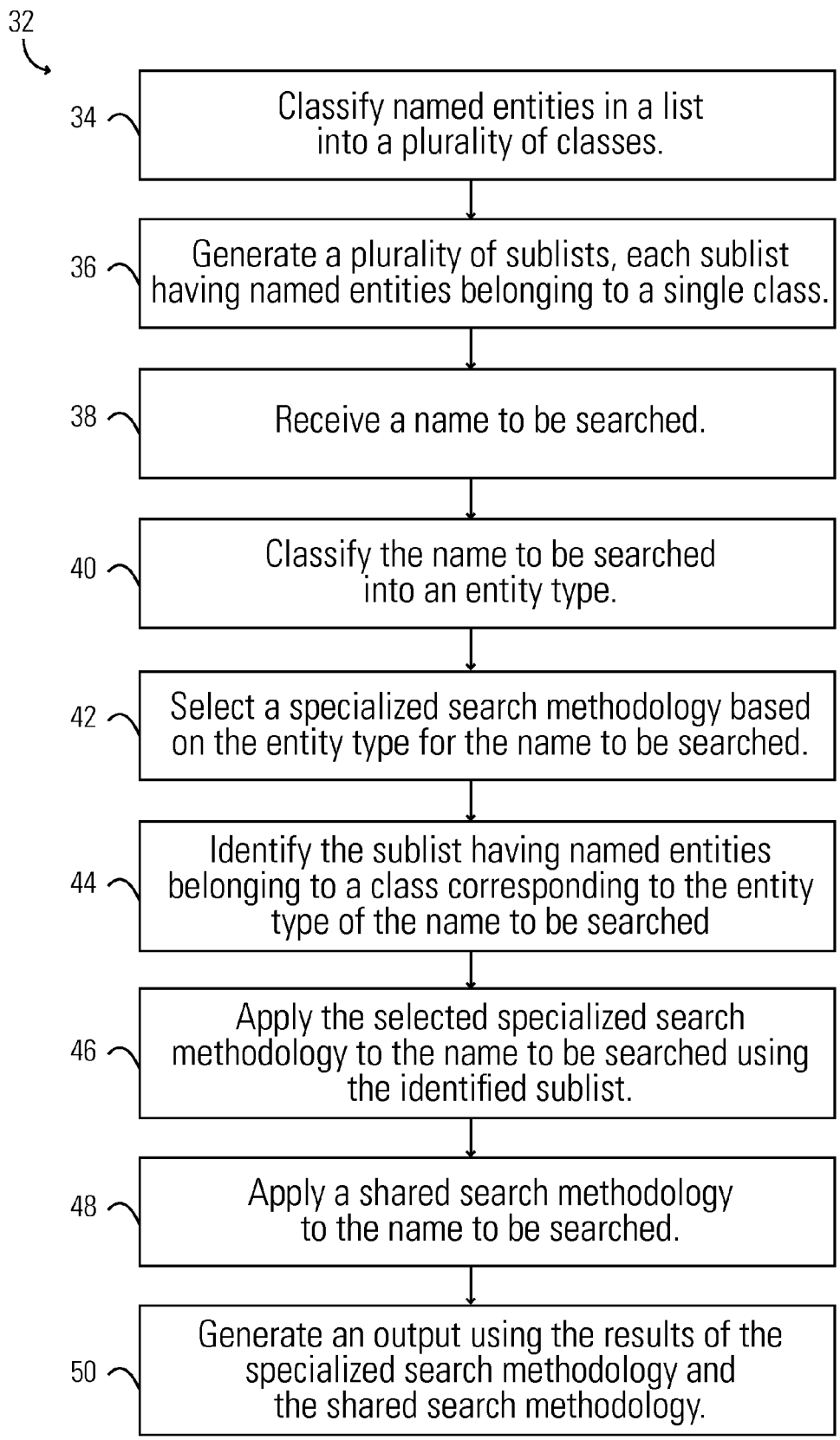
FIG. 2 shows a flow chart of a technique for using entity-driven logic in name searching of mixed-entity lists in accordance with an embodiment of the invention.

FIG. 2 shows a flow chart of a method 32 of name-searching in mixed-entity lists. In step 34 the named entities in a mixed-entity list are classified into a plurality of classes. These results are then used to generate a plurality of sublists, where each sublist includes the names from the mixed-entity list belonging to a single class, in step 36. In one embodiment, steps 34 and 36 are performed by the named entity categorizer 12, shown in FIG. 1.

A name to be searched is received, in step 38, and this name may then be classified into an entity type, in step 40. This may be done by the name to be searched classifier 16. A specialized search methodology may then be selected based on the entity type of the name to be searched, in step 42. In step 44, a sublist having named entities belonging to the class corresponding to the entity type of the name to be searched is identified. It may be noted that an entity may be judged to belong to more than one category and thus may be added to more than one list. For example, James Adams, DDS might be added to both a personal name and an organization name list, with appropriate search logic applying in each case. Similarly, a query name like this one could trigger a search of more than one entity-type list. Which list(s) to be searched for any particular query name can be determined by business rules.

In step 46, the previously selected specialized search methodology may then be used to search for the name to be searched in the identified sublist. In one embodiment, step 46 may be performed by specialized search logic unit 20. Entity-specific reference data, such as the entity-specific reference data 26 shown in FIG. 1 may be used by the specialized search logic unit 20, in step 46.

A shared search methodology may then be applied to the name to be searched, in step 48. In one embodiment, step 48 may be performed by the shared search logic unit 18, shown in FIG. 1. The results of the specialized search methodology and the shared search methodology may then be used to generate a search output 50. In one embodiment, the search logic unit 14 shown in FIG. 1 combines the results from the specialized search logic unit 20 and the shared search logic unit 18 to generate a search result 30. In some embodiments, the presentation layer is dependent upon business rules. There are many possible implementations; for example, returns could be sorted by the list they were retrieved from, results could ignore entity type and be sorted according to relevance, only results matching the entity type of the query could be presented, or various other rules could be applied.

As can be seen from the above disclosure, embodiments of the invention provide techniques for searching for names in structured lists that contain two or more types of named entities. The invention may provide improved effectiveness, as measured by precision and recall measures. The present invention avoids the need to express searching and matching logic in terms of properties common to all the named entity types within the mixed-entity list as was required by the prior art systems.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wire line, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 3:
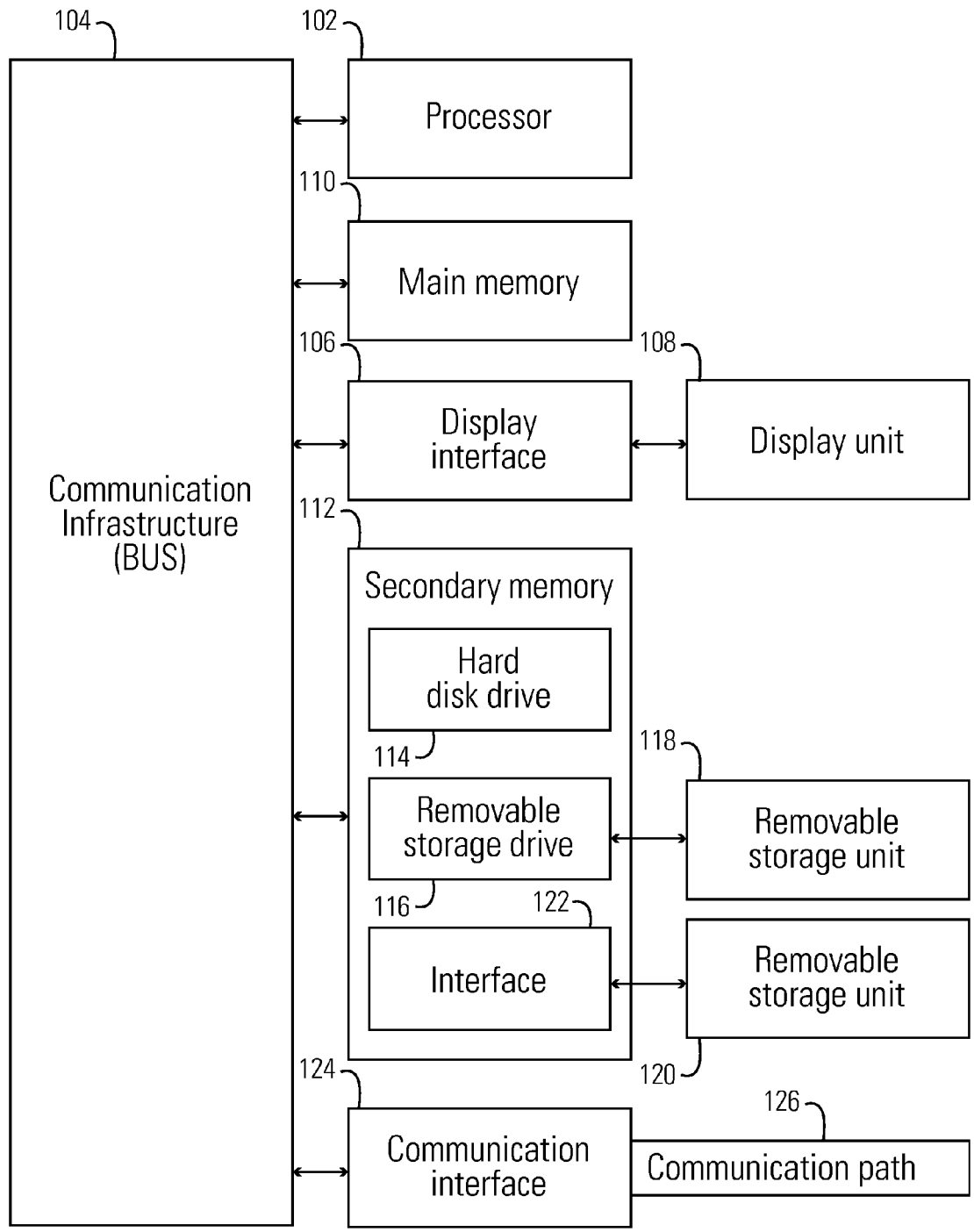
FIG. 3 shows a high level block diagram of an information processing system useful for implementing one embodiment of the present invention.

FIG. 3 is a high level block diagram showing an information processing system useful for implementing one embodiment of the present invention. The computer system includes one or more processors, such as processor 102. The processor 102 is connected to a communication infrastructure 104 (e.g., a communications bus, cross-over bar, or network). Various software embodiments are described in terms of this exemplary computer system. After reading this description, it will become apparent to a person of ordinary skill in the relevant art(s) how to implement the invention using other computer systems and/or computer architectures.

The computer system can include a display interface 106 that forwards graphics, text, and other data from the communication infrastructure 104 (or from a frame buffer not shown) for display on a display unit 108. The computer system also includes a main memory 110, preferably random access memory (RAM), and may also include a secondary memory 112. The secondary memory 112 may include, for example, a hard disk drive 114 and/or a removable storage drive 116, representing, for example, a floppy disk drive, a magnetic tape drive, or an optical disk drive. The removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, the removable storage unit 118 includes a computer readable medium having stored therein computer software and/or data.

In alternative embodiments, the secondary memory 112 may include other similar means for allowing computer programs or other instructions to be loaded into the computer system. Such means may include, for example, a removable storage unit 120 and an interface 122. Examples of such means may include a program cartridge and cartridge interface (such as that found in video game devices), a removable memory chip (such as an EPROM, or PROM) and associated socket, and other removable storage units 120 and interfaces 122 which allow software and data to be transferred from the removable storage unit 120 to the computer system.

The computer system may also include a communications interface 124. Communications interface 124 allows software and data to be transferred between the computer system and external devices. Examples of communications interface 124 may include a modem, a network interface (such as an Ethernet card), a communications port, or a PCMCIA slot and card, etc. Software and data transferred via communications interface 124 are in the form of signals which may be, for example, electronic, electromagnetic, optical, or other signals capable of being received by communications interface 124. These signals are provided to communications interface 124 via a communications path (i.e., channel) 126. This communications path 126 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 110 and secondary memory 112, removable storage drive 116, and a hard disk installed in hard disk drive 114.

Computer programs (also called computer control logic) are stored in main memory 110 and/or secondary memory 112. Computer programs may also be received via communications interface 124. Such computer programs, when executed, enable the computer system to perform the features of the present invention as discussed herein. In particular, the computer programs, when executed, enable the processor 102 to perform the features of the computer system. Accordingly, such computer programs represent controllers of the computer system.

From the above description, it can be seen that the present invention provides a system, computer program product, and method for implementing the embodiments of the invention. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for searching a database, the method comprising:
   dividing a mixed list of entities of different categories of named entities into a plurality of entity-specific lists, wherein each entity specific list represents one category of named entity, and wherein the entity specific lists are for different categories of named entities; receiving a name to be searched;
   classifying the received name into one of the categories of the entity specific lists; determining the entity specific list having the category of the received name; selecting specialized search logic that is designed to be applied to the category of the received name; and
   applying the selected specialized search logic to the determined entity specific list to search for the received name in the determined entity specific list;
   applying a shared search logic to multiple of the categories of the named entities to search the received name; and
   combining the search results of the specialized search logic and the shared search logic in output results.

2. A system for searching a database, the system comprising: a processor; a memory, including:
   a mixed list of named entities of different categories of named entities; search logic unit including a plurality of specialized search logic units; a named-entity categorizer unit for dividing the mixed list of named entities into a plurality of entity specific lists, wherein each entity specific list represents one category of named entity, and wherein the entity specific lists are for different categories of named entities;
   a name categorizer unit for classifying a received name into one of the categories of the entity specific lists; and
   logic executed by the processor to:
   receiving a name to be searched;
   determining the entity specific list having the category of the received name;
   selecting a specialized search logic comprising one of the specialized search logic units that is designed to be applied to the category of the received name; and
   applying the selected specialized search logic to the determined entity specific list to search for the received name in the determined entity specific list;
   wherein the search logic unit further includes a shared search logic unit, wherein the logic is further executed to:
   applying the shared search logic unit to multiple of the categories of the named entities to search the received name; and
   combining the search results of the specialized search logic and the shared search logic in output results.

3. A system according to claim 2 wherein the search logic unit includes a matching and scoring unit and is executed to use the shared search logic unit and the specialized search log unit to search each candidate name in at least the determined entity specific list using the matching and scoring unit to rank and score a set of candidate match names.

4. A computer program product for searching a database, the computer program product comprising a memory or storage device having computer usable program code configured to:
   divide a mixed list of entities of different categories of named entities into a plurality of entity-specific lists, wherein each entity specific list represents one category of named entity, and wherein the entity specific lists are for different categories of named entities; receiving a name to be searched;
   classifying the received name into one of the categories of the entity specific lists; determine the entity specific list having the category of the received name; select specialized search logic that is designed to be applied to the category of the received name; and
   apply the selected specialized search logic to the determined entity specific list to search for the received name in the determined entity specific list;
   wherein the computer usable program code is further configured to:
   apply a shared search logic to multiple of the categories of the named entities to search the received name; and
   combine the search results of the specialized search logic and the shared search logic in output results.

5. A computer program product according to claim 4 wherein the computer usable program code if further configured to repeat the categorizing and applying to a second received name.

6. A computer program product according to claim 5 wherein the computer usable program code is further configured to apply the shared search logic to the second received name.

* * * * *